United States Patent
Gleason et al.

(10) Patent No.: US 11,394,116 B2
(45) Date of Patent: Jul. 19, 2022

(54) DUAL OPTICAL AND RF PHASED ARRAY AND PHOTONIC INTEGRATED CIRCUIT

(71) Applicant: Raytheon Company, Waltham, MA (US)

(72) Inventors: Benn Gleason, Tucson, AZ (US); Gerald P. Uyeno, Tucson, AZ (US); Sean D. Keller, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 660 days.

(21) Appl. No.: 16/419,515

(22) Filed: May 22, 2019

(65) Prior Publication Data

US 2020/0373662 A1 Nov. 26, 2020

(51) Int. Cl.

| | |
|---|---|
| *H01Q 3/26* | (2006.01) |
| *G01S 17/88* | (2006.01) |
| *G02F 2/02* | (2006.01) |
| *H01Q 3/34* | (2006.01) |
| *H04B 10/50* | (2013.01) |
| *H01Q 3/00* | (2006.01) |

(52) U.S. Cl.
CPC ........... *H01Q 3/2676* (2013.01); *G01S 17/88* (2013.01); *G02F 2/02* (2013.01); *H01Q 3/2682* (2013.01); *H01Q 3/34* (2013.01); *H04B 10/50* (2013.01); *H04B 2210/006* (2013.01)

(58) Field of Classification Search
CPC .................................................... G02F 1/2955
See application file for complete search history.

(56) References Cited

U.S. PATENT DOCUMENTS

| | | | | |
|---|---|---|---|---|
| 4,725,844 A | * | 2/1988 | Goodwin | H01Q 3/2676 342/374 |
| 4,736,463 A | * | 4/1988 | Chavez | H01Q 3/34 359/107 |
| 4,885,589 A | * | 12/1989 | Edward | H01Q 3/2676 342/368 |
| 5,333,000 A | * | 7/1994 | Hietala | H01Q 3/2676 342/368 |
| 5,977,911 A | * | 11/1999 | Green | H01Q 3/2676 342/375 |
| 6,020,850 A | * | 2/2000 | Ji | H01Q 3/2676 342/368 |

(Continued)

OTHER PUBLICATIONS

Stulemeijer, J., "Photonic Integrated Beamformer for a Phased Array Antenna," ECOC '98, Sep. 20-24, 1998, Madrid Spain.

(Continued)

*Primary Examiner* — Bernarr E Gregory
(74) *Attorney, Agent, or Firm* — Schwegman Lundberg & Woessner, P.A.

(57) ABSTRACT

A photonic integrated circuit (PIC) provides a common architecture to feed both optical and RF phased arrays that may be used for missile guidance, mobile data links, autonomous vehicles and 5G cellular communications. A plurality of switches are monolithically fabricated on the PIC with the optical feed network to switch the optical power of the phase-modulated optical channel signals between the integrated optical antennas and the RF antennas to produce steerable optical and RF beams. The photo-detectors and RF antennas may be discrete components or integrated with the optical feed network.

20 Claims, 10 Drawing Sheets

(56) References Cited

U.S. PATENT DOCUMENTS

| | | | | |
|---|---|---|---|---|
| 6,124,827 | A * | 9/2000 | Green | H01Q 3/2676 342/372 |
| 6,426,721 | B1 * | 7/2002 | Obara | H01Q 3/2676 342/372 |
| 9,104,086 | B1 * | 8/2015 | Davids | G02F 1/2955 |
| 9,614,280 | B2 | 4/2017 | Shi et al. | |
| 2004/0033004 | A1 * | 2/2004 | Welch | H04B 10/50 385/14 |
| 2006/0012519 | A1 * | 1/2006 | Mizuma | H01Q 3/2676 342/368 |
| 2012/0068880 | A1 * | 3/2012 | Kullstam | H01Q 3/26 342/81 |
| 2014/0231627 | A1 * | 8/2014 | Wakatsuki | H01Q 3/2676 250/208.2 |
| 2017/0131615 | A1 * | 5/2017 | Park | G02F 1/025 |
| 2017/0293074 | A1 * | 10/2017 | Park | G02B 6/34 |
| 2017/0324162 | A1 * | 11/2017 | Khachaturian | H01Q 3/2676 |
| 2018/0039154 | A1 * | 2/2018 | Hashemi | G02F 1/2955 |
| 2018/0102847 | A1 * | 4/2018 | Kim | G02F 1/025 |
| 2019/0020109 | A1 * | 1/2019 | Puleri | H01Q 3/2676 |

OTHER PUBLICATIONS

Behrooz et al., "A 21-D Heterodyne Lens-Free Optical Phased Array Camera with Reference Phase Shifting," ILLL Photonics Journal, vol. 10, No. 5, Sep. 2018.

Fatemi et al., "A Low Power PWM Optical Phased Array Transmitter with 16° Field-of-View and 0.8° Beamwidth," 2018 IEEE Radio Frequency Integrated Circuit Symposium.

Fatemi et al., "A Nonuniform Sparse 2-D Large-FOV Optical Phased Array With a Low-Power PWM Drive," 2019 IEEE, IEEE Journal of Solid State Circuits.

Analog Photonics, "APSUNY Process Development Kit Full-Build Component Library Documentation," Sponsored by AIM Photonics Institute, copyright 2017.

Kohno et al., "Ghost imaging using a large-scale silicon photonic phased array chip," Optics Express 3817, vol. 27, No. 3, Feb. 4, 2019.

Jung et al., "High efficiency low threshold current 1.3 μm InAs quantum dot lasers on on-axis (001) GaP/Si," Applied Physics Letters III, 122107 (2017).

* cited by examiner

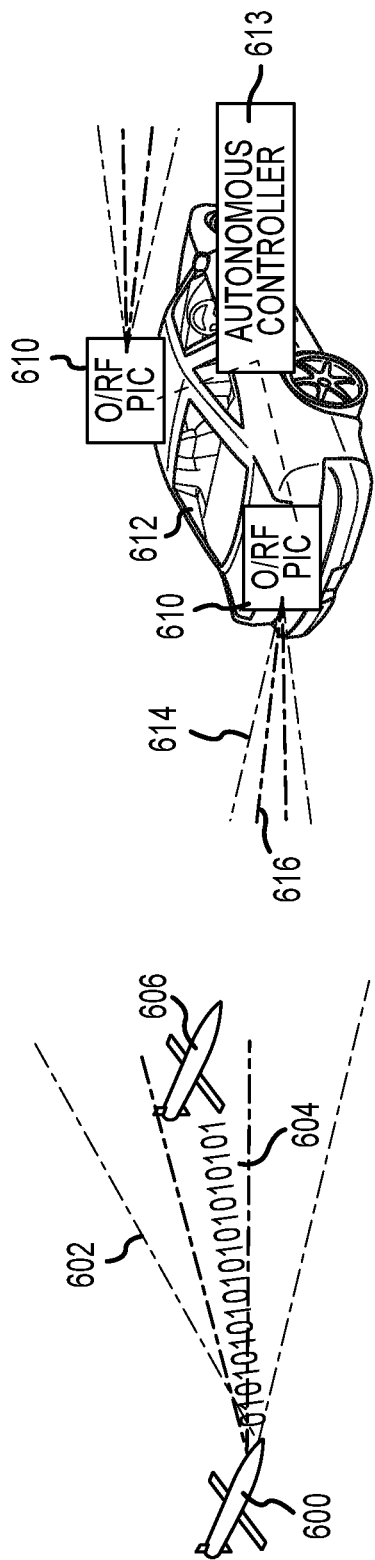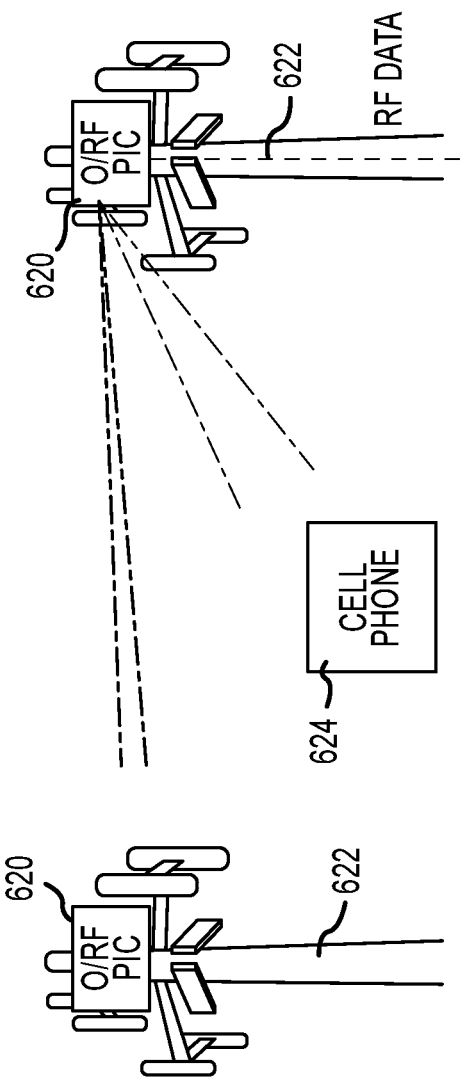

DUAL OPTICAL AND RF PHASED ARRAY AND PHOTONIC INTEGRATED CIRCUIT

BACKGROUND OF THE INVENTION

Field of the Invention

This invention relates to optical and radio frequency (RF) phased arrays and more particularly to a photonic integrated circuit (PIC) that provides a common architecture for both optical and RF phased arrays that may be used in applications such as guidance, mobile communications, autonomous vehicle navigation or 5G communication.

Description of the Related Art

RF transmitters are used to broadcast signals for such applications as radio and televisions, establish bi-directional communications such as between cell phones and as part of radar systems. The RF (microwave) spectrum extends to 300 GHz with 0-30 GHz representing conventional RF applications and 30-300 GHz referred to as millimeter wave (MMW). The RF transmitter generates an electrical feed signal a desired RF reference frequency that drives an RF antenna to broadcast the RF beam.

One type of RF transmitter is known as a "phased array", a computer-controlled array of antennas that creates a beam of RF waves that can be electronically steered to point in different directions without moving the antennas. In a phased array, the RF electrical feed signal is fed to the individual antennas with the correct phase relationship so that the RF waves from the separate antenna add together to increase the radiation in a desired direction, while cancelling to suppress radiation in undesired directions. The power from the transmitter is fed to the antennas through devices called phase shifters, controlled by the computer system, which can alter the phase electronically, thus steering the beam of RF waves to a different direction. The phased array typically comprises many small antennas (sometimes thousands) to achieve high gain.

A drawback to phased RF phased arrays is the large volume and weight of the RF-electronic beamforming network. This problem is overcome using an optical feed network to provide the RF electrical feed signals. The principle of operation uses a coherent detection scheme to directly transfer the phase and amplitude of an optical signal to a microwave signal by mixing this signal with an optical local oscillator (LO) signal. If the optical frequency of the LO signal differs by 10 GHz from the input signal than a 10 GHz microwave signal with the same phase as the optical signal will be obtained after combination and detection of the two signals. In this way, modulation of phase and amplitude of a microwave signal can be performed using optical phase and amplitude modulators, which are much smaller than their counterpart RF devices. See "Photonic Integrated Beamformer for a Phased Array Antenna" J. Stulemeijer, et. al. ECOC '98, 20-24 Sep. 1998 Madrid, Spain and "Radiofrequency signal-generation system with over seven octaves of continuous tuning" Garret J Schneider, et. al. Nature Photonics, 20 Jan. 2013.

As shown in FIG. 1, a typical optical feed network 10 feeds first and second optical signals 12 and 14 at frequencies $\omega 1$ and $\omega 2$ having a frequency difference directly proportional to a desired RF reference frequency into respective 1-to-N optical waveguide splitters 16 and 18, which split the signals into optical channel signals. N electro-optic phase modulators 20, responsive to computer-controlled steering commands from a controller 21, phase modulate the $\omega 1$ optical channel signals. N 2-to-1 optical waveguide combiners 22 combine the phase-shifted $\omega 1$ optical channel signals and $\omega 2$ optical channel signals, respectively, to form combined optical channel signals, which are optically coupled to N photo-detectors 24 that detect the respective combined optical channel signals and generate a plurality of RF electrical feed signals 26 that drive RF antennas 28 to produce a steerable RF beam at the desired RF reference frequency. The optical feed network sans the photo-detectors has been integrated onto a single chip, referred to as a "photonic integrated circuit (PIC)".

The principles behind RF phased arrays can also be applied to the optical spectrum where they are referred to as Optical Phased Arrays (OPAs). The optical spectrum is typically quoted at 1550 nm (193 THz) for telecommunication purposes but includes wavelengths from the ultraviolet (<400 nm, 750 THz) through the infrared (up to 15,000 nm, 20 THz). OPAs have received considerable attention due to the numerous applications they enable such as LiDAR, high-speed free-space point-to-point communications and sensing with compact and favorable form factors. A basic OPA architecture provides an optical signal to a 1-to-N optical waveguide splitter that splits the signal into optical channel signals. N electro-optic phase modulators, responsive to computer-controlled steering commands, phase modulate the optical channel signals. These optical channel signals are fed to N optical antennas (e.g., nano-antennas), which produce a steerable optical beam. California Institute of Technology has been a leader in the development of OPAs and the integration of many of the optical elements on a single chip or PIC. See "A 1-D Heterodyne Lens-Free Optical Phased Array Camera With Reference Phase Shifting" B. Abiri et. al IEEE Photonics Journal Volume 10 Number 5, September 2018, "A Low Power PWM Optical Phased Array Transmitter With 16° Field-Of-View and 0.8° Beamwidth" Reza Fatemi et. al. 2018 IEEE Radio Frequency Integrated Circuits Symposium (RFIC), 10-12 Jun. 2018 pp. 28-31 and "A Nonuniform Sparse 2-D Large-FOV Optical Phased Array With a Low-Power PWM Drive" Reza Fatemi et. al. IEEE Journal of Solid-State Circuits 22 Feb. 2019, pages 1-16.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a photonic integrated circuit (PIC) that provides a common architecture to feed both optical and RF phased arrays. The PIC may be used to provide steerable optical and RF beams for applications such as guidance, mobile data links, autonomous vehicles and 5G cellular communications.

This is accomplished with an optical feed network that splits first and second optical signals having a frequency difference equal to a desired RF frequency into an equal number of first and second optical channel signals, phase modulates the first optical channel signals, combines the phase-modulated first and the second optical channel signals and uses photo-detectors to convert the combined optical channel signals to RF electrical feed signals at a respective plurality of RF bond pads. A plurality of switches selectively re-direct the phase-shifted first optical channel signals to feed a respective plurality of optical antennas to produce a steerable optical beam. The switches may be binary switches that time multiplex the steerable optical and RF beams or as variable splitters that apportion the optical power between the optical and the RF to generate coincident optical and RF beams. The switches may be positioned either before or after the optical combiners. The optical feed network, the switches, and the optical antennas are monolithically fabricated on the PIC. The photo-detectors and RF antenna elements may also be integrated on the PIC.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 10a through 10c illustrate application of the dual optical/RF source for mobile communications, autonomous vehicles and 5G cellular communications.

DETAILED DESCRIPTION OF THE INVENTION

The present invention describes a photonic integrated circuit (PIC) that provides a common architecture to feed both optical and RF phased arrays that may be used for guidance, mobile data links, autonomous vehicles and 5G cellular communications. A plurality of switches are monolithically fabricated on the PIC with the optical feed network to switch the optical power of the phase-modulated optical channel signals between the integrated optical antennas and the RF antennas to produce steerable optical and RF beams. The photo-detectors and RF antennas may be discrete components or integrated with the optical feed network.

Figure 1:
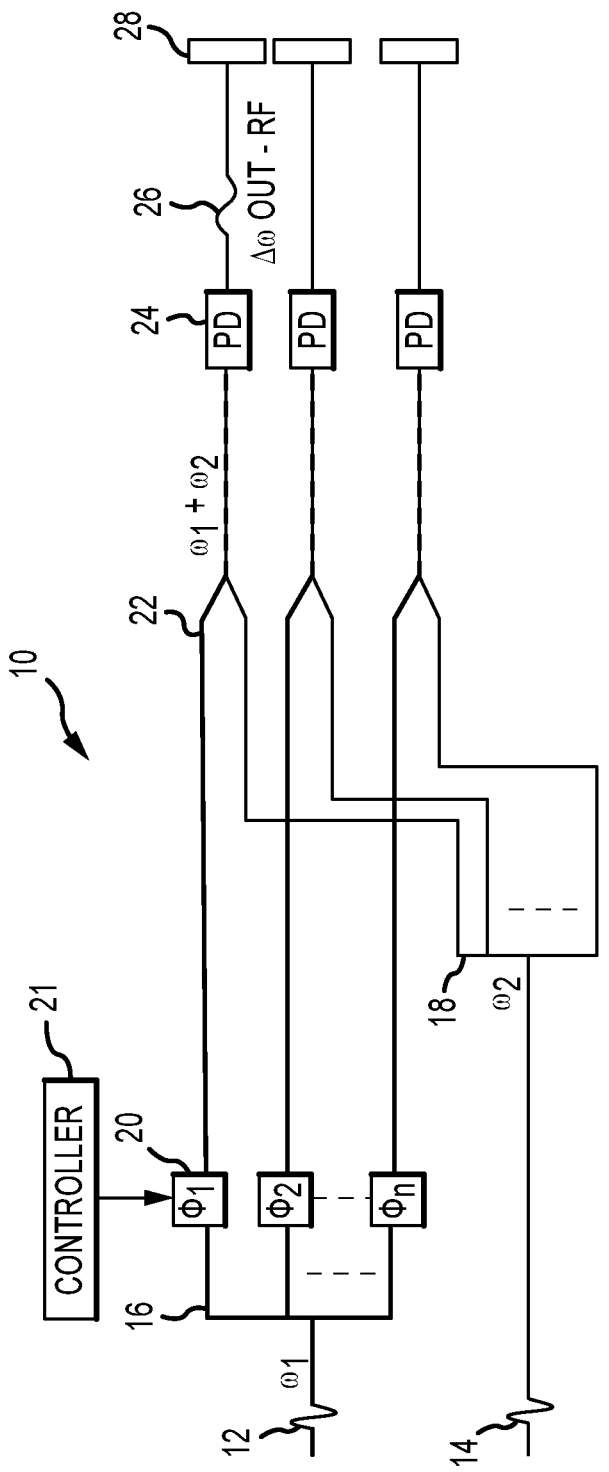
FIG. 1, as described above, is a diagram of an optical feed network for an RF phased array.
Figure 2:
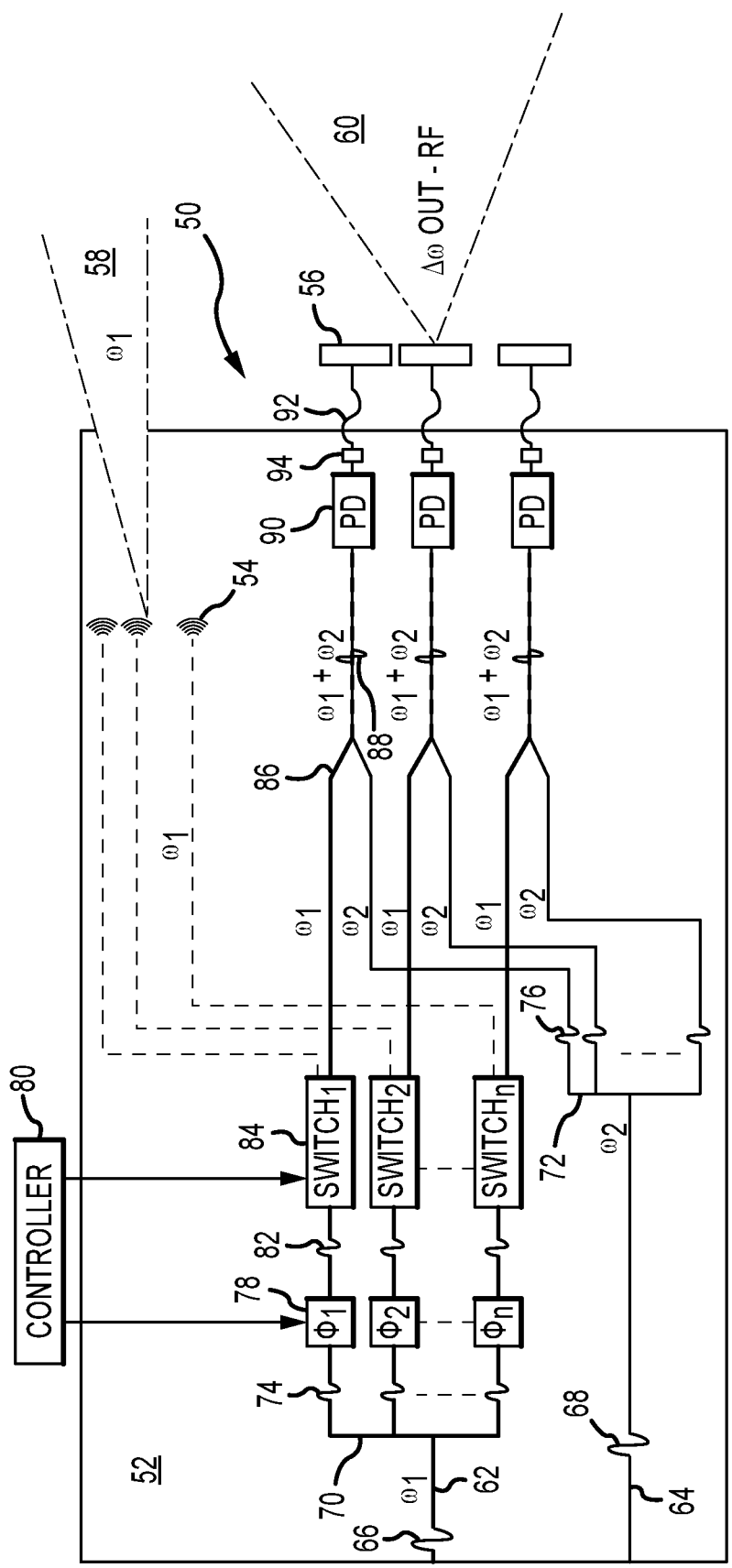
FIG. 2 is a diagram of an embodiment for a switchable optical feed network for optical and RF phased arrays.

In reference to FIG. 2, an embodiment of a dual optical and RF phase array 50 that comprises a PIC 52 that provides a common architecture to feed both optical phased arrays 54 and RF phased arrays 56 from a single chip to generate either coincident or time multiplexed steerable optical and RF beams 58 and 60. The RF phased array may be discrete off-chip antennas or monolithically fabricated on the optical/RF ("O/RF") PIC.

PIC 52 includes monolithically fabricated first and second optical waveguides 62 and 64 configured to receive first and second optical signals 66 and 68 at frequencies $\omega 1$ and $\omega 2$ having a frequency difference equal to a desired RF frequency. In an alternate embodiment, the PIC may be configured to receive the first optical signal at frequency $\omega 1$ and the RF signal as inputs and generate the second optical signal at frequency $\omega 2$ on-chip. First and second optical waveguide 1:N splitters 70 and 72 split each of the first and second optical signals 66 and 68 into an equal number N of $\omega 1$ and $\omega 2$ optical channel signals 74 and 76. A plurality of electro-optical phase modulators 78 responsive to steering command signals from a controller 80 phase modulate the $\omega 1$ optical channel signals 74, respectively, to produce phase-shifted $\omega 1$ optical channel signals 82.

A plurality of switches 84 responsive to switching command signals from controller 80 selectively re-direct the phase-shifted first optical channel signals 82 to the optical phased array 54 to produce the steerable optical beam 58 or pass the signals 82 forward to a plurality of optical waveguide 2:1 combiners 86. The switches may be "binary" switches that redirect effectively 100% of the optical power to either the optical phased array or the combiner, in which case the controller time multiplexes the optical and RF beams. The controller may modify the duty cycle as dictated by a particular application or changing conditions of the application. The switches may also be "variable" switches that apportion the optical power 0-100% between both the optical phased array and the combiner, in which case coincident optical and RF beams are produced. The controller can modify the amount of optical power directed to either channel as dictated by a particular application or changing conditions of the application. In an alternate embodiment, the switches may be wavelength selective binary/variable switches that are positioned after combiners 86.

Combiners 86 combine the phase-shifted $\omega 1$ optical channel signals 82 and $\omega 2$ optical channel signals 76, respectively, to form combined optical channel signals 88, which are fed to a plurality of photo-detectors 90. Each combiner may feed L photo-detectors to match the optical power provided by the feed network to the capabilities of the photo-detectors to avoid damaging the devices and to maximize RF power. The photo-detectors may be monolithically fabricated on the PIC or discrete devices off-chip. The photo-detectors 90 convert the combined optical channel signals 88 to RF electrical feed signals 92 at the desired RF frequency. Feed signals 92 are provided to RF bond pads 94 on the chip to drive the RF phased array 56 to produce steerable RF beam 60.

Figure 3:
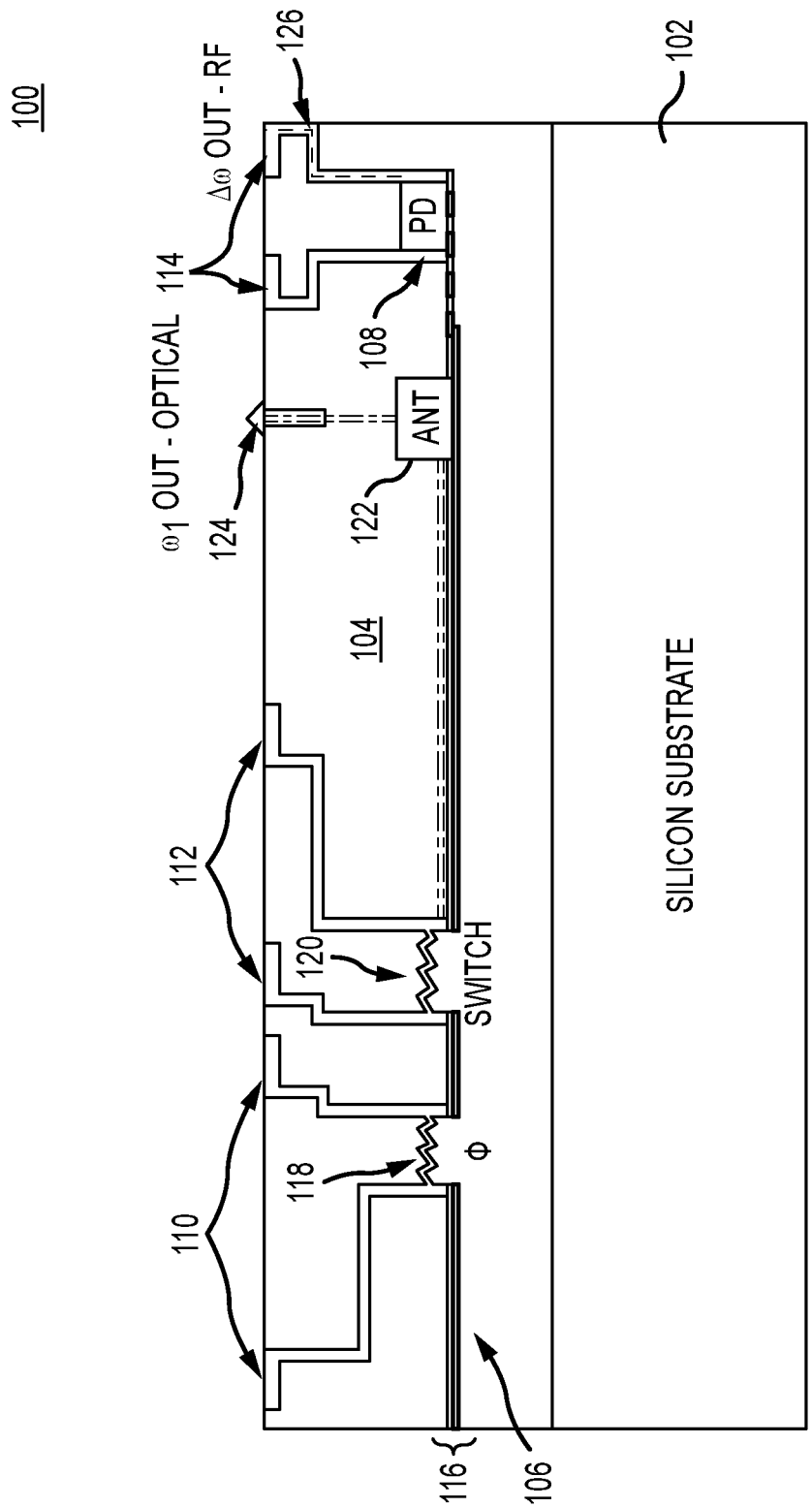
FIG. 3 is a side view of a monolithically fabricated PIC in which the switchable optical feed network and OPA reside in a single layer.
Figure 4A:
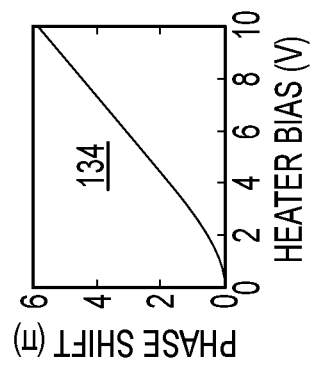
FIGS. 4a-4b and 5a-5b are embodiments of a thermo-optic phase modulator and thermo-optic switch in the optical feed network.
Figure 5A:
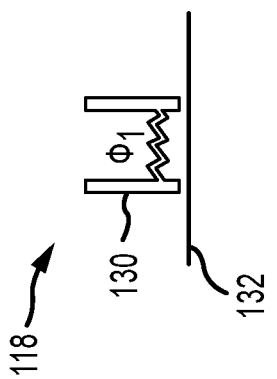
Figure 4B:
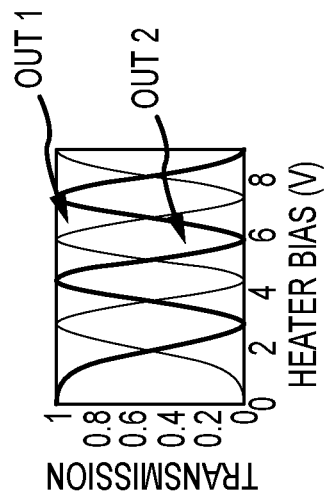
Figure 5B:
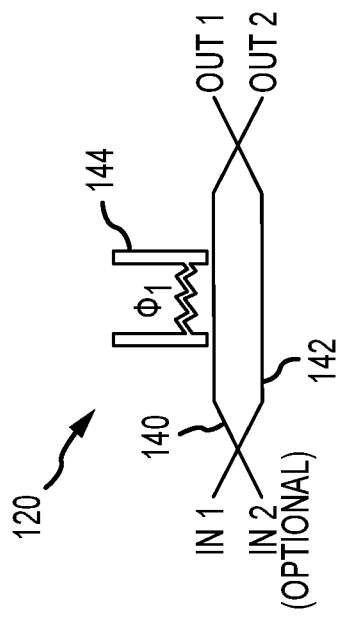

In reference to FIG. 3, an embodiment of a dual optical and RF phased array PIC 100 is monolithically fabricated using Silicon processing on a silicon substrate 102. Layers of $SiO_2$ 104 in which the optical feed network 106, photo-detectors 108 and metallization for phase modulator contacts 110, switch contacts 112 and RF bond pads 114 are formed provide thermal and electrical insulation. In this embodiment, the $\omega 1$ and $\omega 2$ portions of the optical feed network 106 are formed in the same layer(s). To implement the feed network topology of FIG. 2 would require the use of waveguide crosses (standard optical elements) to cross the $\omega 2$ optical channel signals 76 over the $\omega 1$ optical channel signals 82 for input to the respective combiners 86.

The optical feed network 106 is suitably fabricating using standard fabrication techniques to form the optical waveguides 62, 64, the optical splitters 70, 72 and optical combiners 86 in an optical layer 116, suitably formed from doped Silicon or Silicon Nitride material. Electrically driven phase modulators 118 and optical switches 120 may be formed in optical layer 116 using P/N junctions doped with Boron, Aluminum, Gallium Indium (p-type) or Phosphorous, Antimony, Arsenic or Lithium (n-type) dopant materials. Optical antennas 122 are formed in optical layer 116 as gratings that redirect light 124 (phase modulated light at $\omega 1$) upward away from the substrate. Photo-detectors 108 are formed on top of optical layer 116, typically of Germanium. The photo-detectors 108 convert light into an electrical feed signal 126 (RF frequency) that is output via one side of RF bond pads 114 (the other side being ground).

In reference to FIGS. 4a-4b and 5a-5b, in an embodiment thermal phase modulators 118 and optical switches 120 are implemented using smaller heater elements to locally change the refractive index of the optical waveguide. In phase modulator 118, a heater 130 is embedded into the optical waveguide 132 to take advantage of the temperature dependent silicon index to add voltage-controlled phase retardation 130. The large thermo-optic index change in silicon induces this phase retardation or shift. The phase shifter is compact but relatively slow compared to electro-optic shifters, which are an alternative. In optical switch 120, the optical signal is split into two arms 140 and 142 with a phase modulator in the form of a heater 144 embedded in one arm. The phase difference between the two arms will switch the light % between outputs 1 and 2. The phase accumulated through each arm is converted to amplitude response when these signals interfere with each other through a combiner at the end of the arms.

Figure 6:
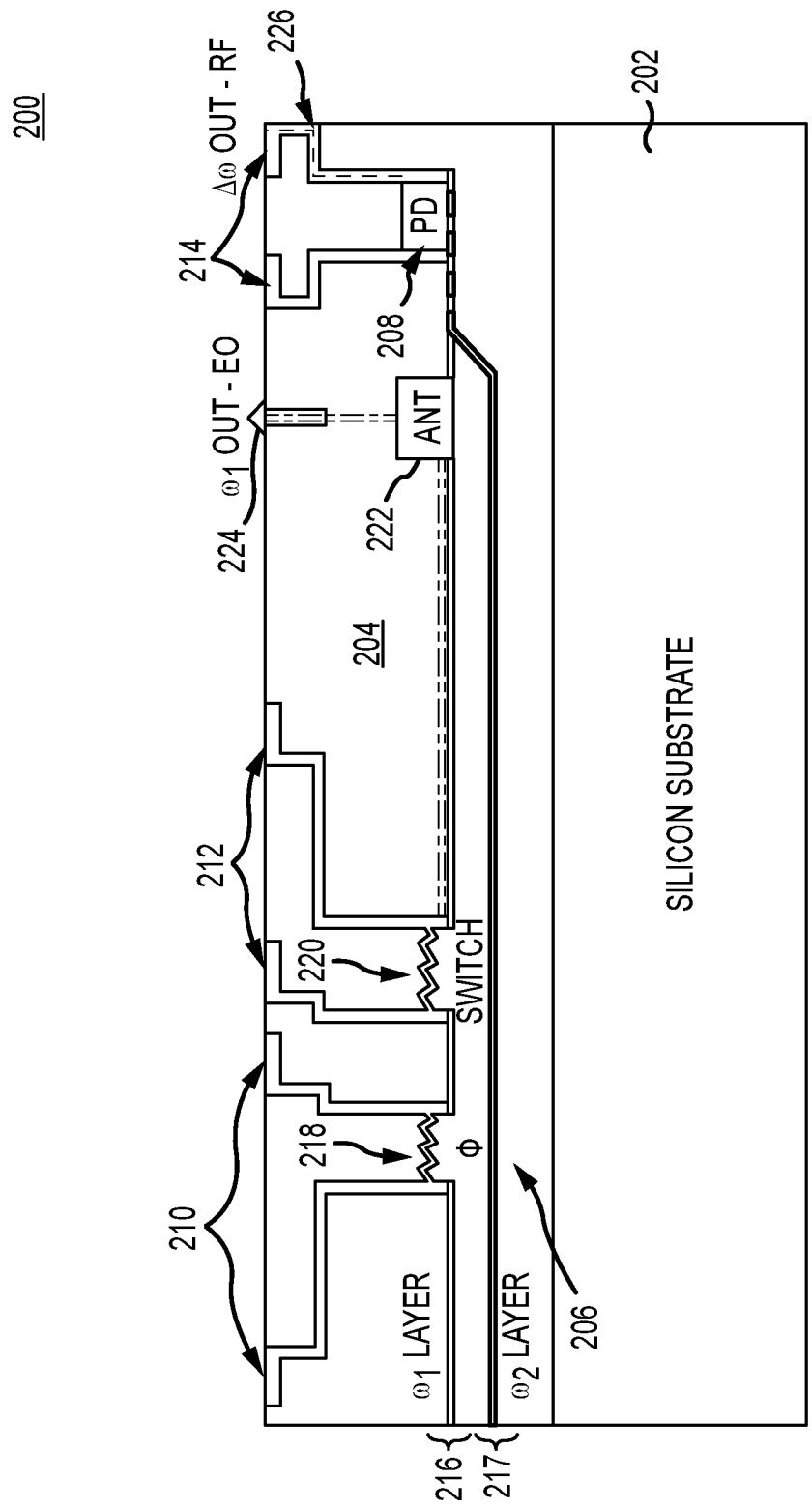
FIG. 6 is a side view of a monolithically fabricated PIC in which the switchable optical feed network and OPA resides in multiple layers.

In reference to FIG. 6, an embodiment of a dual optical and RF phased array PIC 200 is monolithically fabricated using Silicon processing on a silicon substrate 202. Layers of $SiO_2$ 204 in which the optical feed network 206, photo-detectors 208 and metallization for phase modulator contacts 210, switch contacts 212 and RF bond pads 214 are formed provide thermal and electrical insulation. In this embodiment, the $\omega 1$ and $\omega 2$ portions of the optical feed network are formed in different optical layer(s). The multi-layer implementation avoids the need for waveguide crosses and may provide for a more compact topology.

The optical feed network 206 is suitably fabricating using standard fabrication techniques to form the optical waveguides 62, 64, the optical splitters 70, 72 and optical combiners 86 shown in FIG. 3 in optical layers 216 and 217, suitably formed from doped Silicon material. Electrically driven phase modulators 218 and optical switches 220 are formed in optical layer 216 using P/N junctions doped with Boron, Aluminum, Gallium Indium (p-type) or Phosphorous, Antimony, Arsenic or Lithium (n-type) dopant materials. Optical antennas 222 are formed in optical layer 216 as gratings that redirect light 224 (phase modulated light at $\omega 1$) upward away from the substrate. The optical waveguides and splitter for light at frequency $\omega 1$ are formed in optical layer 217 and directed upwards to optical layer 216 to the combiners. Photo-detectors 208 are formed on top of optical layer 216, typically of Germanium. The photo-detectors 208 convert light into an electrical feed signal 226 (RF frequency) that is output via one side of RF bond pads 214 (the other side being ground).

Figure 7:
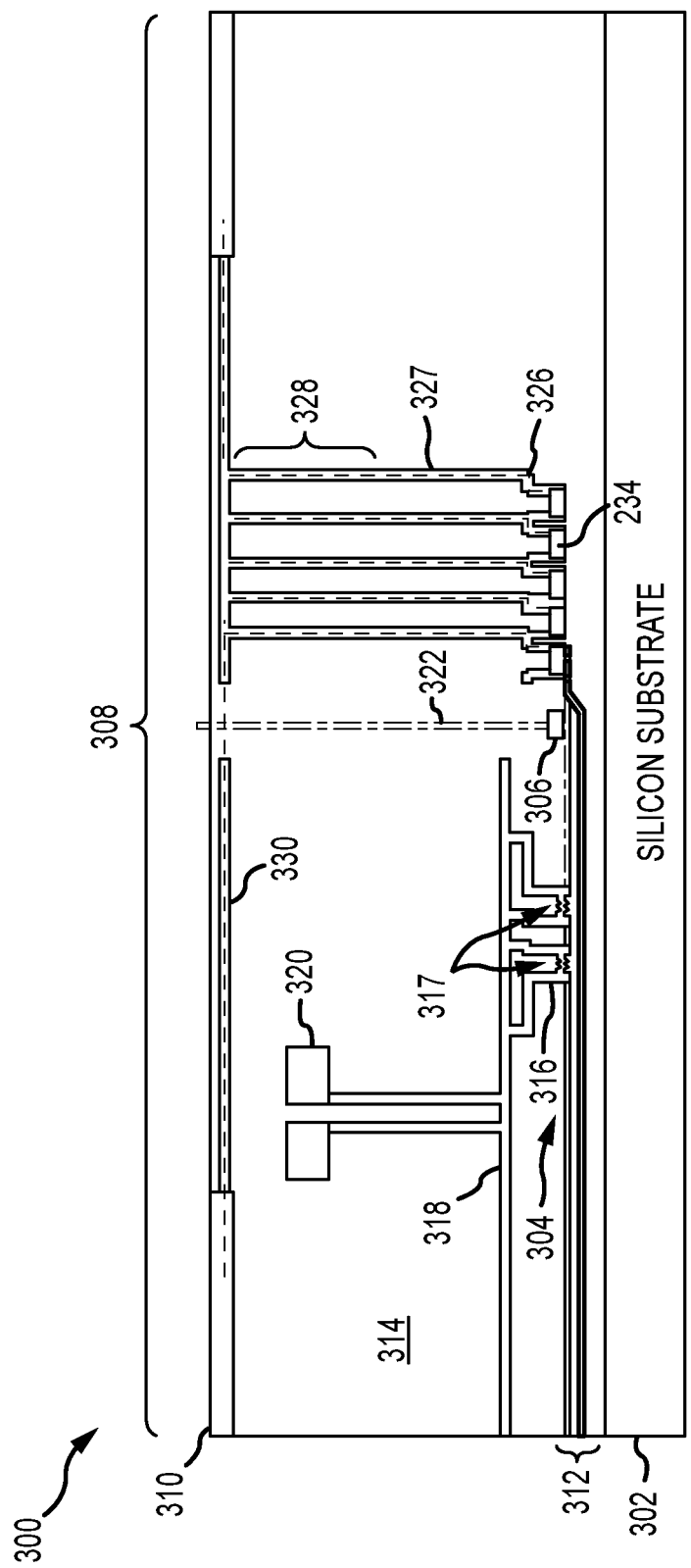
FIG. 7 is a side view of a monolithically fabricated PIC in which the RF antenna is integrated with the switchable optical feed network and OPA.

In reference to FIG. 7, an embodiment of a dual optical and RF phased array PIC 300 is monolithically fabricated using Silicon processing on a silicon substrate 302 to include an optical feed network 304, an optical phased array 306 and an RF phased array 308. Full monolithic integration provides a desirable advantage of having the entire feed modulate formed on a single chip. The drawbacks include the cost of the wafer and wafer processing to accommodate the RF phased array, which is much larger than the optical phased array and feed network. In fact, the optical feed network and optical phased array are small enough to be fabricated between individual radiating elements 310 of the RF phased array or in place of one such element.

Optical feed network 304 and is formed in optical layer(s) 312 in the insulating layer 314. Metallization 316 couples the photonic components 317 (phase modulators, switches) to an electrical control layer 318 and electrical control components 320. An optical via 322 routes light vertically from optically phased array 306 out of the chip. Photo-detectors 324 are formed on top of the optical layer(s) and coupled to RF bond pads 326. Electrical vias 327 route the RF feed signals vertically through electrical components 328 such as transistors, amplifiers etc. to an RF signal layer 330 on the surface of the chip where the RF signals are distributed to the radiating elements 310 of the RF phased array 308.

Figure 8:
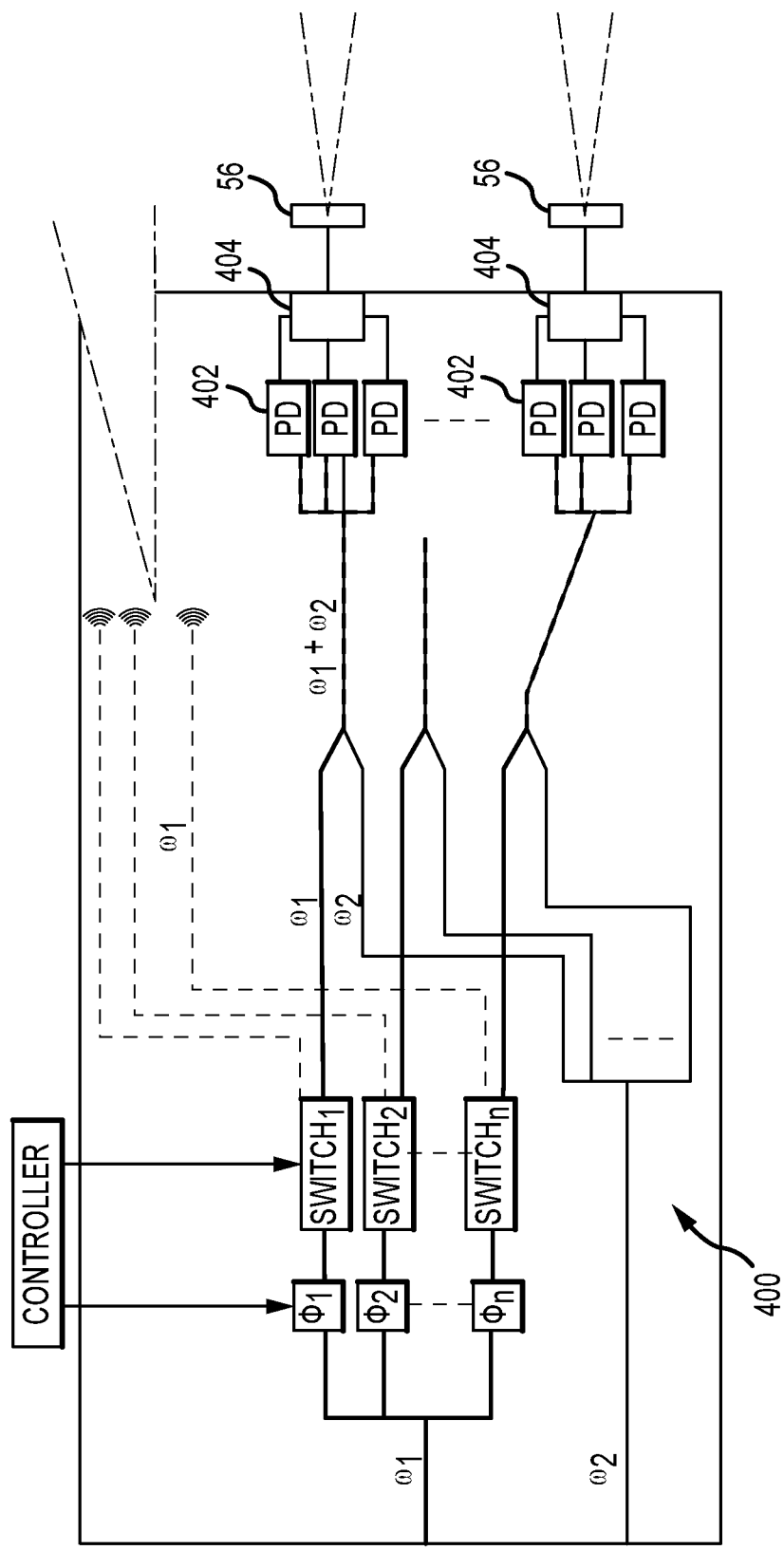
FIG. 8 is a diagram for an alternative embodiment of the switchable optical feed network in which multiple photo-detectors per channel feed a single RF bond pad to increase RF power.

In reference to FIG. 8, in an alternate embodiment each channel of an optical feed network 400 is configured to drive a plurality of M photo-detectors 402 to convert the combined phased modulated $\omega 1$ optical channel signals and $\omega 2$ optical channel signals to M RF electrical feed signals. N summing elements 404 each combine the M RF electrical feed signals for a different channel and forward the summed RF electrical feed signal to an RF bond pad 56. For compactness, the same reference numbers for FIG. 2 are used for the remainder of the embodiment and that description is not repeated. This configuration both protects the individual photo-detectors 402 from being damaged and increases the RF power. For example, each channel of the optical feed network 400 may deliver 20 mW of power. An individual photo-detector 402 may have a power limit of 5 mW. Using M=4 photo-detectors per channel protects the photo-detectors and nominally quadruples the RF output power.

Figure 9A:
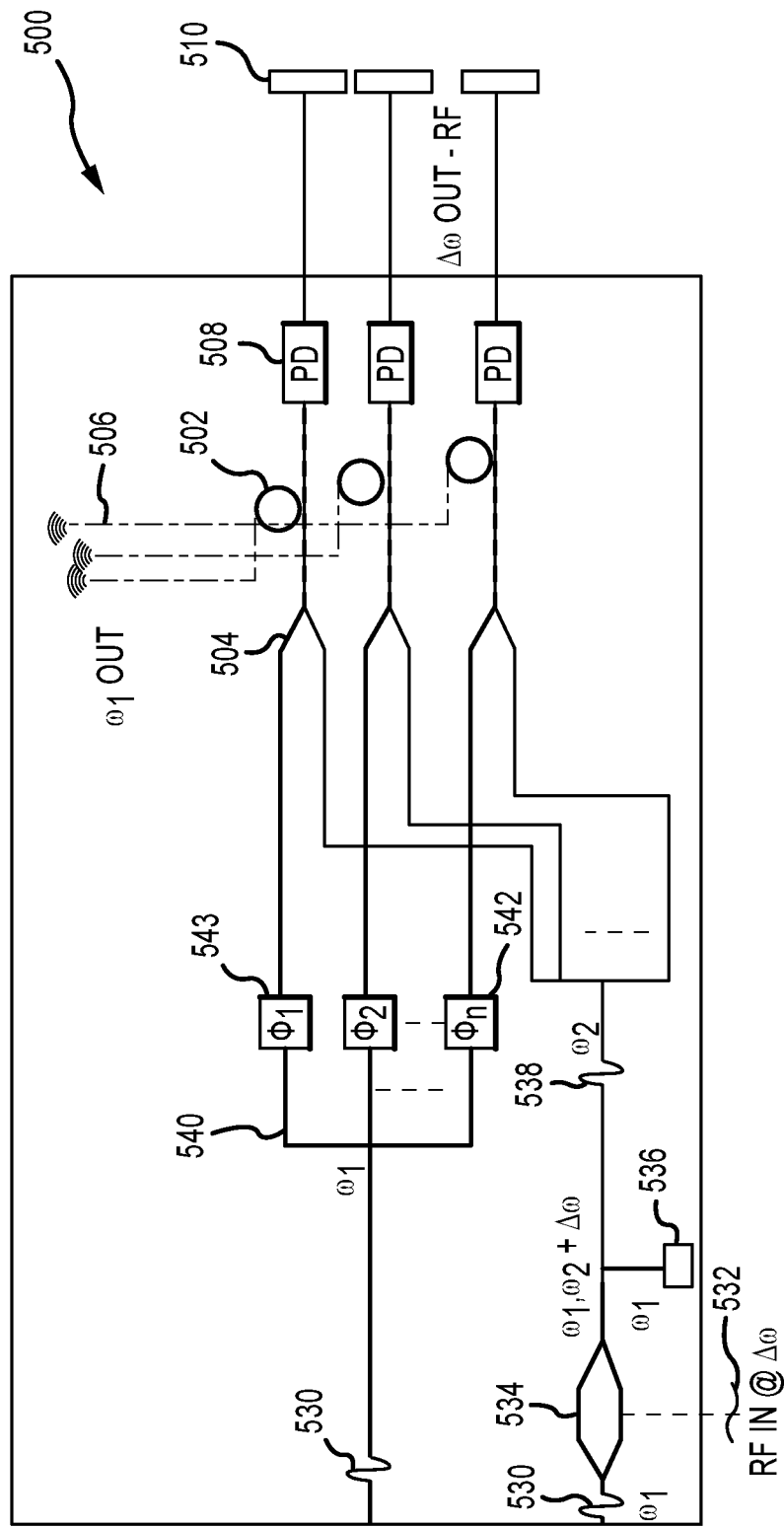
FIGS. 9a through 9c illustrate an alternate embodiment of the switchable optical feed network in which a wavelength selective switch is positioned after the combiner.
Figure 9C:
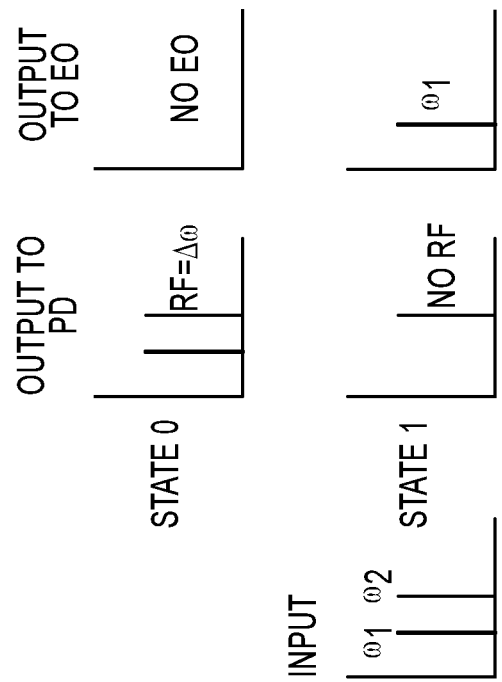
Figure 9B:
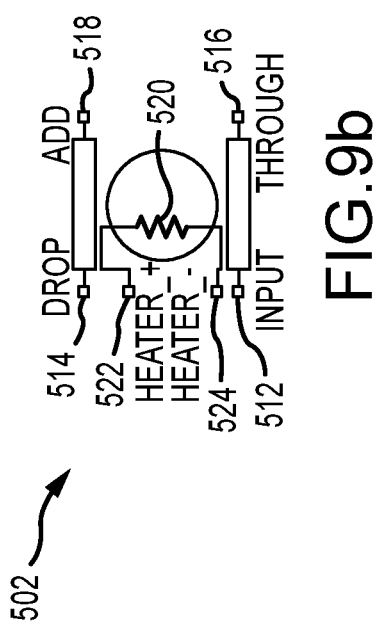

In reference to FIGS. 9a-9c, in an alternative embodiment of a dual optical and RF phased array 500, wavelength selective switches 502 are positioned after 2:1 optical combiners 504 to selectively redirect the phase-shifted $\omega 1$ optical channel signals to either an optical phased array 506 or via photo-detectors 508 to an RF phased array 510.

As shown in FIGS. 9b-9c, an embodiment of wavelength selective switch 502 might include a micro-disk or micro-ring filter/switch in which thermally controlled index changes lead to resonance changes to produce switching. As shown, the switch is configurable as a three-level switch but is configured as a two-level switch for this application. The combined optical signal is fed to the input terminal 512, the drop terminal 514 is coupled to optical phased array 506 and the through terminal 516 is output to the photo-detectors. The add terminal 518 is unused in the binary configuration, and may be terminated as necessary. A voltage is applied across heating element 520 through terminals 522 and 524. Given an input of the combined optical signal including $\omega 1$ and $\omega 2$, in state 0 the switch outputs both the $\omega 1$ and $\omega 2$ frequencies to the photo-detector and nothing to the optical antenna and in state 1 the switch outputs only $\omega 2$ to the photo-detector and the phase-modulated $\omega 1$ to the optical antenna, which forms the optical beam. Application of the $\omega 2$ signal alone to the RF phased array does not produce an RF beam. Alternately, this signal could be terminated on-chip.

Also shown in FIG. 9a is an alternate configuration for generating the optical input signals at the ω1 and ω2 frequencies. In this configuration, the inputs to the PIC are a single optical signal 530 at frequency ω1 and an RF signal 532. An optical modulator 534 modulates optical signal 530 at frequency ω1 with RF signal 532 to produce an optical signal including both the ω1 frequency component and a ω1 plus Δω component. The ω1 component is directed to an optical termination 536 leaving only a ω2 signal 538. The ω1 signal 530 and ω2 signal 538 are directed to respective 1:N optical splitters 540 and 542. The ω1 channels pass through phase modulators 544 and are recombined with the ω2 channels via combiners 504. In another embodiment, a laser source for the optical signal 530 is provided on-chip. The laser source can be grown directly onto the PIC with an active material such as III-V material or with quantum dots.

As shown in FIGS. 10a-10c, the photonic integrated circuit (PIC) that provides a common architecture to feed both optical and RF phased arrays may be used for guidance, mobile data links, autonomous vehicles and 5G cellular communications.

As shown in FIG. 10a, the PIC and phased arrays may be mounted on a mobile platform 600 such as a drone, manned vehicle etc. In one configuration, the steerable RF and optical beams 602 and 604 may be used to interrogate a target 606 with wavelengths covering LADAR/LIDAR and RADAR bands from a single integrated system. In another configuration, the steerable RF 602 beam may be used to detect, track and establish a low data rate communications link with another mobile platform 606. The steerable optical beam 606 can be used to establish a high data rate link with the other mobile platform. Note, given the same number of elements in the phased array, the RF beam will naturally be considerably wider given the disparity in wavelengths. Thus the RF beam is better suited for initial detection of the opposite platform and to establish the link. The narrower optical beam provides a much higher data rate capability.

As shown in FIG. 10b, a number of O/RF PICs and phased arrays 610 are mounted on an autonomous vehicle 612 and controlled by an autonomous controller 613. The steerable optical beam 614 and steerable RF beam 616 cover LADAR/LIDAR and RADAR bands from a single integrated system to interrogate the environment and facilitate autonomous navigation.

As shown in FIG. 10c, one or more PICs and phased arrays 620 may be mounted on cellular towers 622. Both the RF and optical beams may be used to establish a 5G communications link with another cellular tower 622 or individual cell phones 624. The cell phones must remain within a direct line-of-sight (LOS) and visible to maintain the optical data link with the cell tower.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A dual optical and radio frequency (RF) phased array, comprising:
    a plurality of RF antennas;
    a plurality of photo-detectors; and
    a photonic integrated circuit (PIC) including monolithically fabricated
    first and second optical waveguides configured to receive first and second optical signals at frequencies ω1 and ω2 having a frequency difference equal to a desired RF frequency;
    first and second optical waveguide splitters coupled to the first and second optical waveguides, respectively, and configured to split each of the first and second optical signals into an equal number of ω1 and ω2 optical channel signals;
    a plurality of electro-optical phase modulators responsive to steering command signals to phase modulate the ω1 optical channel signals, respectively, to produce phase-shifted ω1 optical channel signals;
    a plurality of optical waveguide combiners that combine the phase-shifted ω1 optical channel signals and ω2 optical channel signals, respectively, to form combined optical channel signals;
    a plurality of optical antennas; and
    a plurality of switches responsive to switching command signals to selectively re-direct the phase-shifted first optical channel signals to the respective plurality of optical antennas to produce a steerable optical beam or the combined optical signals to the plurality of PDs, which convert the optical signals to RF electrical feed signals that drive the respective RF antennas to produce a steerable RF beam at the desired RF reference frequency.

2. The dual optical and RF phased array of claim 1, wherein the plurality of switches are positioned in front of the respective plurality of optical waveguide combiners.

3. The dual optical and RF phased array of claim 2, wherein the plurality of switches are binary switches that switch all of the optical power of the phase-shifted ω1 optical channel signals between the respective optical antennas and the respective optical waveguide combiners to time multiplex the steerable optical beam and the steerable RF beam.

4. The dual optical and RF phased array of claim 2, wherein the plurality of switches are variable switches that apportion the optical power of the phase-shifted ω1 optical channel signals between the respective optical antennas and the respective optical waveguide combiners to generate both the steerable optical beam and the steerable RF beam at the same time.

5. The dual optical and RF phased array of claim 1, wherein the plurality of switches are wavelength selective switches positioned behind the respective plurality of optical waveguide combiners.

6. The dual optical and RF phased array of claim 5, wherein the plurality of wavelength selective switches are binary switches that switch all of the optical power of the phase-shifted ω1 optical channel signals between the respective optical antennas and the respective optical waveguide combiners to time multiplex the steerable optical beam and the steerable RF beam.

7. The dual optical and RF phased array of claim 5, wherein the plurality of wavelength selective switches are variable switches that apportion the optical power of the phase-shifted ω1 optical channel signals between the respective optical antennas and the respective optical waveguide combiners to generate both the steerable optical beam and the steerable RF beam at the same time.

8. The dual optical and RF phased array of claim 1, wherein the plurality of photo-detectors are discrete devices located off of the PIC.

9. The dual optical and RF phased array of claim 1, wherein the plurality of photo-detectors are monolithically fabricated on the PIC.

10. The dual optical and RF phased array of claim 1, wherein the plurality of RF antennas are monolithically fabricated on the PIC.

11. The dual optical and RF phased array of claim 1, wherein the optical path lengths for each of the cot optical channel signals are matched.

12. The dual optical and RF phased array of claim 1, wherein a plurality of the photo-detectors per channel are coupled to a common RF bond pad.

13. The dual optical and RF phased array of claim 1, further comprising a mobile platform on which the phased array is mounted, said steerable RF beam used to detect, track and establish a communications link with another mobile platform, said steerable optical beam used to establish a high data rate link with the other mobile platform.

14. The dual optical and RF phased array of claim 1, further comprising an autonomous vehicle on which the phased array is mounted, wherein the steerable optical beam and steerable RF beam cover LADAR/LIDAR and RADAR bands from a single integrated system.

15. The dual optical and RF phased array of claim 1, further comprising a cellular tower on which the phased array is mounted, said steerable RF beam used to establish a 5G communications link with another cellular tower or individual cell phones, said steerable optical beam used to establish a high data rate link with the other cellular tower or individual cell phones within line-of-sight (LOS).

16. A dual optical and radio frequency (RF) phased array, comprising:
   a monolithically fabricated photonic integrated circuit (PIC) including
   first and second optical waveguides configured to receive first and second optical signals at frequencies ω1 and ω2 having a frequency difference equal to a desired RF frequency;
   first and second optical waveguide splitters coupled to the first and second optical waveguides, respectively, and configured to split each of the first and second optical signals into an equal number of ω1 and ω2 optical channel signals;
   a plurality of electro-optical phase modulators responsive to steering command signals to phase modulate the ω1 optical channel signals, respectively, to produce phase-shifted ω1 optical channel signals;
   a plurality of optical waveguide combiners that combine the phase-shifted ω1 optical channel signals and ω2 optical channel signals, respectively, to form combined optical channel signals;
   a plurality of RF bond pads;
   a plurality of photo-detectors configured to detect the respective combined optical channel signals and feed a plurality of RF electrical feed signals at the desired RF frequency to the RF bond pads;
   a plurality of optical antennas; and
   a plurality of switches responsive to switching command signals to re-direct the phase-shifted ω1 optical channel signals to the respective plurality of optical antennas to produce a steerable optical beam at frequency ω1.

17. The dual optical and RF phased array of claim 16, wherein the plurality of switches are variable switches that apportion the optical power of the phase-shifted ω1 optical channel signals between the respective optical antennas and the respective optical waveguide combiners to generate both the steerable optical beam and the steerable RF beam at the same time.

18. The dual optical and RF phased array of claim 16, wherein a plurality of the photo-detectors per channel are coupled to a common RF bond pad.

19. A photonic integrated circuit (PIC) for a dual optical and radio frequency (RF) phased array, comprising:
   a plurality of RF bond pads;
   an optical feed network that splits first and second optical signals having a frequency difference equal to a desired RF frequency into an equal number of first and second optical channel signals, phase modulates the first optical channel signals, combines the phase-modulated first and the second optical channel signals and uses photo-detectors to convert the combined optical channel signals to RF electrical feed signals at the respective plurality of RF bond pads;
   a plurality of optical antennas; and
   a plurality of switches responsive to switching command signals to re-direct the phase-shifted first optical channel signals to the respective plurality of optical antennas to produce a steerable optical beam.

20. The PIC of claim 19, wherein a plurality of the photo-detectors per channel are coupled to a common RF bond pad.

* * * * *